United States Patent
Zhao

(10) Patent No.: US 10,791,521 B2
(45) Date of Patent: Sep. 29, 2020

(54) DATA SENDING METHOD AND APPARATUS, AND TERMINAL

(71) Applicant: Huawei Technologies Co., Ltd., Shenzhen (CN)

(72) Inventor: Peng Zhao, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 15/780,950

(22) PCT Filed: Dec. 3, 2015

(86) PCT No.: PCT/CN2015/096247
§ 371 (c)(1),
(2) Date: Jun. 1, 2018

(87) PCT Pub. No.: WO2017/091994
PCT Pub. Date: Jun. 8, 2017

(65) Prior Publication Data
US 2018/0376425 A1    Dec. 27, 2018

(51) Int. Cl.
*H04L 12/26*  (2006.01)
*H04W 52/02*  (2009.01)
*H04W 4/80*  (2018.01)
*H04W 4/00*  (2018.01)
*H04L 29/06*  (2006.01)
*H04W 48/18*  (2009.01)
*H04W 4/90*  (2018.01)

(52) U.S. Cl.
CPC ......... *H04W 52/0261* (2013.01); *H04L 69/22* (2013.01); *H04W 4/00* (2013.01); *H04W 4/80* (2018.02); *H04W 48/18* (2013.01); *H04W 52/02* (2013.01); *H04W 4/90* (2018.02); *Y02D 70/10* (2018.01); *Y02D 70/14* (2018.01); *Y02D 70/144* (2018.01); *Y02D 70/26* (2018.01)

(58) Field of Classification Search
USPC .... 370/229, 230, 230.1, 235, 252, 311, 314, 370/345, 433, 436, 458, 498, 49, 8, 465, 370/466
See application file for complete search history.

(56) References Cited

U.S. PATENT DOCUMENTS 6,771,599 B1 * 8/2004 Aoyama ............. H04L 12/5602
                                                         370/230
7,248,853 B1 * 7/2007 Sakarya ................. G01C 21/32
                                                         455/404.1
9,380,144 B1 * 6/2016 Kritt ................. H04M 1/72538
(Continued)

FOREIGN PATENT DOCUMENTS

CN        101043438 A       9/2007
CN        103414983 A       11/2013
(Continued)

*Primary Examiner* — Nguyen H Ngo
(74) *Attorney, Agent, or Firm* — Slater Matsil, LLP

(57) ABSTRACT

A data sending method and apparatus, and a terminal. The method includes determining, when a low energy short range wireless communication protocol is used to run a data transmission service, and according to at least one of a service type of the data transmission service or a user indication, a data sending mode for running the data transmission service, and running the data transmission service in the determined data sending mode.

20 Claims, 10 Drawing Sheets

(56) References Cited

U.S. PATENT DOCUMENTS

| | | | |
|---|---|---|---|
| 10,136,429 B2* | 11/2018 | Lee | H04L 1/16 |
| 2010/0302979 A1* | 12/2010 | Reunamaki | H04M 1/7253 |
| | | | 370/311 |
| 2014/0092730 A1 | 4/2014 | Yang | |
| 2014/0094198 A1 | 4/2014 | Heo et al. | |
| 2014/0293976 A1* | 10/2014 | Huang | H04W 74/04 |
| | | | 370/337 |
| 2015/0341724 A1 | 11/2015 | Pedersen et al. | |
| 2015/0350811 A1* | 12/2015 | Fernandez | H04W 4/90 |
| | | | 455/41.2 |
| 2016/0014550 A1* | 1/2016 | Chiddarwar | H04W 52/0216 |
| | | | 455/41.2 |
| 2016/0044693 A1 | 2/2016 | Sun et al. | |

FOREIGN PATENT DOCUMENTS

| | | |
|---|---|---|
| CN | 104039016 A | 9/2014 |
| CN | 104184553 A | 12/2014 |
| CN | 104184946 A | 12/2014 |
| CN | 104318741 A | 1/2015 |
| CN | 104601203 A | 5/2015 |
| GB | 2494758 A | 3/2013 |
| IN | 5632CH2013 A | 8/2015 |
| WO | 2013175741 A1 | 11/2013 |
| WO | 2015062672 A1 | 5/2015 |

\* cited by examiner

DATA SENDING METHOD AND APPARATUS, AND TERMINAL

CROSS-REFERENCE TO RELATED APPLICATIONS

This application claims the benefit of International Application No. PCT/CN2015/096247, filed on 3 Dec. 2015, which application is hereby incorporated herein by reference.

TECHNICAL FIELD

The present invention relates to the field of wireless communications, and in particular, to a data sending method and apparatus, and a terminal.

BACKGROUND

As wireless communications technologies develop, terminals that provide a Bluetooth® communication function become increasingly popular. For example, most of wearable terminals, mobile phones, in-vehicle terminals, and the like provide the short range wireless communication protocol, using, for example, a Bluetooth® communication function. Compared with a conventional Bluetooth® protocol, a low energy short range wireless protocol, such as the newly formulated Bluetooth® Low Energy (BLE) protocol provides an effective solution for a terminal product that requires high power consumption. The BLE protocol and the conventional Bluetooth® protocol are independent in terms of protocol content and implementation. Generally, the BLE protocol is applicable to a case in which a terminal transmits a small volume of data, for example, transmits a control command with only several bytes. In this case, a high transmission rate is not required by the terminal. However, when the terminal needs to transmit a large volume of data, for example, when a wristband upgrade package needs to be sent from a mobile phone end to a wristband product, a relatively high transmission rate is required by the terminal. For these rate-sensitive services, the BLE protocol greatly deteriorates user experience.

To effectively increase a data transmission rate while reducing terminal power consumption, a data sending method in the prior art uses the following solution: When the BLE protocol is used to perform data transmission, a specific quantity of packets are sent in a connection event interval. For example, in a typical application scenario shown in FIG. 1, an application (APP) constantly sends user data to a link layer (LL) based on a logical link control and adaptation protocol (L2CAP). Assuming that one piece of data needs to be divided into eight LL datagrams (LL_Data) for transmission, three pieces of data shown in FIG. 1 need to be divided into 24 pieces of LL_Data for transmission. Six pieces of LL_Data are transmitted in one connection event interval, that is, six packet (packet) exchanges are performed. A whole process undergoes four connection event intervals.

It can be learned from the above that, in the prior-art data sending method, data is constantly sent to the LL, but the LL transmits only little data in a connection event interval. For example, in FIG. 1, data transmission is performed only six times. In this case, a large quantity of air interface resources are wasted, an average transmission rate is low, and the data transmission rate cannot be effectively increased. Consequently, user experience is poor, and some services even cannot run properly.

SUMMARY

Embodiments of the present invention provide a data sending method and apparatus, and a terminal, so as to effectively increase a data transmission rate while reducing terminal power consumption.

According to an aspect, a data sending method is provided. In this method, a data sending mode used is unfixed. When a BLE protocol is used to run a data transmission service, a data sending mode for running the data transmission service is determined according to a service type of the service and/or a user indication, and the data transmission service runs in the determined data sending mode. According to the method, a high-rate data sending mode or a low-rate data sending mode can be flexibly selected according to an emergency level of the data transmission service, so as to implement an effective balance between a reduction of terminal power consumption and an increase of a data transmission rate.

In a possible design, when the service type of the service and/or the user indication identify/identifies that the service belongs to an emergency service, it is determined that the data sending mode for running the data transmission service is a first sending mode, where the first sending mode is a data sending mode in which packets are constantly sent in each connection event interval, and the connection event interval is a time interval between two connection events. The connection event interval is in a unit of 1.25 ms, and a value of the connection event interval is from 6 to 3200. That is, the connection event interval is a time from 7.5 ms to 4 s.

In a possible design, when it is determined that the data sending mode for running the data transmission service is the first sending mode, it is determined, in each connection event interval, whether a data packet is currently to be sent. If it is determined that a data packet is currently to be sent, the data packet is sent; or if it is determined that no data packet is currently to be sent, an empty packet is sent. In such a manner, an empty packet is sent when no data packet is to be sent. This can ensure that: When no data packet is to be sent in a connection event interval, a terminal does not enter a sleep state, and when a data packet is to be sent subsequently, the data packet can continue to be sent in the connection event interval with no need to wait for a next connection event interval. Therefore, a transmission time in each connection event interval is effectively used, and a data transmission rate is increased.

In a possible design, when the service type of the service and/or the user indication identify/identifies that the service belongs to a non-emergency service, it is determined that the data sending mode for running the data transmission service is a second sending mode, where the second sending mode is a data sending mode in which a predetermined quantity of packets are sent in each connection event interval, and the connection event interval is a time interval between two connection events.

In a possible design, when it is determined that the data sending mode for running the data transmission service is the second sending mode, it is first determined, in each connection event interval, whether a quantity of packets sent in the connection event interval is less than the predetermined quantity. When a determining result is that the quantity of the currently sent packets is less than the predetermined quantity, it is then determined whether a data packet is currently to be sent. If it is determined that a data packet is currently to be sent, the data packet is sent; or if it is determined that no data packet is currently to be sent, an empty packet is sent. This data sending mode in which a fixed quantity of packets are sent in each connection event interval can effective reduce power consumption.

In a possible design, when it is determined that the data sending mode for running the data transmission service is the second sending mode, it is determined, in each connection event interval, that a quantity of currently sent packets is less than the predetermined quantity, and it is determined whether a data packet is currently to be sent. If it is determined that a data packet is currently to be sent, the data packet is sent; or if it is determined that no data packet is currently to be sent, packet sending in the connection event interval is stopped. In this data sending mode, a maximum quantity of packets that can be sent in each connection event interval is set. When no data packet is to be sent, packet sending is stopped, and power consumption can further be effectively reduced.

In a possible design, when the service type of the service and/or the user indication identify/identifies that the service belongs to a non-emergency service, it is determined that the data sending mode for running the data transmission service is a third sending mode, where the third sending mode is a data sending mode in which data packets are constantly sent in each connection event interval, and the connection event interval is a time interval between two connection events. In this data sending mode, a quantity of packets sent in each connection event interval is unfixed, a maximum of packets that can be sent is not set, and a data transmission rate is higher than that of the second sending mode. However, because only data packets are sent, when there is no data packet currently, a terminal enters a sleep state, and the data transmission rate is lower than that of the first sending mode.

In a possible design, when it is determined that the data sending mode for running the data transmission service is the third sending mode, it is determined, in each connection event interval, whether a data packet is currently to be sent. If it is determined that a data packet is currently to be sent, the data packet is sent; or if it is determined that no data packet is currently to be sent, packet sending in the connection event interval is stopped.

According to another aspect, an embodiment of the present invention provides a terminal. The terminal has a function of implementing an actual behavior of a terminal in the foregoing method. The function may be implemented by using hardware, and may also be implemented by hardware by executing corresponding software. The hardware or the software includes one or more modules corresponding to the foregoing function.

In a possible design, a structure of the terminal includes a processor and a Bluetooth® communications interface. The processor is configured to support the terminal to execute the corresponding function in the foregoing method. The Bluetooth® communications interface is configured to support the terminal to communicate with another terminal, and send information, an instruction, or data involved in the foregoing method to the another terminal. The terminal may further include a memory. The memory is configured to couple with the processor, and the memory stores a program instruction and data necessary for the terminal.

According to still another aspect, an embodiment of the present invention provides a terminal. The terminal has a function of implementing a behavior of a data receiver terminal in the foregoing method design. The function may be implemented by using hardware, and may also be implemented by hardware by executing corresponding software. The hardware or the software includes one or more modules corresponding to the foregoing function. The module may be software and/or hardware.

In a possible design, a structure of the terminal includes a Bluetooth® communications interface and a processor. The Bluetooth® communications interface is configured to support the terminal to receive various instructions and service data sent by the foregoing data sender terminal to this terminal. The processor controls the terminal to receive the service data by using the Bluetooth® communications interface.

According to another aspect, an embodiment of the present invention provides a data sending apparatus. The apparatus includes: a determining unit, configured to: when a Bluetooth® Low Energy (BLE) protocol is used to run a data transmission service, determine, according to a service type of the service and/or a user indication, a data sending mode for running the data transmission service; and a sending unit, configured to run the data transmission service in the data sending mode determined by the determining unit.

In a possible design, the determining unit is specifically configured to: when the BLE protocol is used to run the data transmission service and when the service type of the service and/or the user indication identify/identifies that the service belongs to an emergency service, determine that the data sending mode for running the data transmission service is a first sending mode, where the first sending mode is a data sending mode in which packets are constantly sent in each connection event interval, and the connection event interval is a time interval between two connection events.

In a possible design, the sending unit includes: a judging subunit, configured to determine, in each connection event interval, whether a data packet is currently to be sent; and a sending subunit, configured to: when the judging subunit determines that a data packet is currently to be sent, send the data packet; or when the judging subunit determines that no data packet is currently to be sent, send an empty packet.

In a possible design, the determining unit is specifically configured to: when the BLE protocol is used to run the data transmission service and when the service type of the service and/or the user indication identify/identifies that the service belongs to a non-emergency service, determine that the data sending mode for running the data transmission service is a second sending mode, where the second sending mode is a data sending mode in which a predetermined quantity of packets are sent in each connection event interval, and the connection event interval is a time interval between two connection events.

In a possible design, the sending unit includes: a determining subunit, configured to determine, in each connection event interval, that a quantity of currently sent packets is less than the predetermined quantity; a judging subunit, configured to determine whether a data packet is currently to be sent; and a sending subunit, configured to: when the judging subunit determines that a data packet is currently to be sent, send the data packet; or when the judging subunit determines that no data packet is currently to be sent, send an empty packet.

In a possible design, the sending unit includes: a determining subunit, configured to determine, in each connection event interval, that a quantity of currently sent packets is less than the predetermined quantity; a judging subunit, configured to determine whether a data packet is currently to be sent; and a sending subunit, configured to: when the judging subunit determines that a data packet is currently to be sent, send the data packet; or when the judging subunit determines that no data packet is currently to be sent, stop packet sending in the connection event interval.

In a possible design, the determining unit is specifically configured to: when the BLE protocol is used to run the data transmission service and when the service type of the service and/or the user indication identify/identifies that the service belongs to a non-emergency service, determine that the data sending mode for running the data transmission service is a third sending mode, where the third sending mode is a data sending mode in which data packets are constantly sent in each connection event interval, and the connection event interval is a time interval between two connection events.

In a possible design, the sending unit includes: a judging subunit, configured to determine, in each connection event interval, whether a data packet is currently to be sent; and a sending subunit, configured to: when the judging subunit determines that a data packet is currently to be sent, send the data packet; or when the judging subunit determines that no data packet is currently to be sent, stop packet sending in the connection event interval.

According to another aspect, an embodiment of the present invention provides a terminal, where the terminal includes a memory, a processor, and a Bluetooth® communications interface, the memory is configured to store a program instruction, and the processor is configured to perform the following operations according to the program instruction stored in the memory, the operations comprising Bluetooth® determining, when a Bluetooth® Low Energy (BLE) protocol is used to run a data transmission service, according to a service type of the service and/or a user indication, a data sending mode for running the data transmission service, and running the data transmission service in the determined data sending mode by using the Bluetooth® communications interface.

In a possible design, that the processor performs the operation of determining, according to a service type of the service and/or a user indication, a data sending mode for running the data transmission service includes: when the service type of the service and/or the user indication identify/identifies that the service belongs to an emergency service, determining that the data sending mode for running the data transmission service is a first sending mode, where the first sending mode is a data sending mode in which packets are constantly sent in each connection event interval, and the connection event interval is a time interval between two connection events.

In a possible design, that the processor performs the operation of running the data transmission service in the determined data sending mode by using the Bluetooth® communications interface includes: determining, in each connection event interval, whether a data packet is currently to be sent; and if determining that a data packet is currently to be sent, sending the data packet by using the Bluetooth® communications interface; or if determining that no data packet is currently to be sent, sending an empty packet by using the Bluetooth® communications interface.

In a possible design, that the processor performs the operation of determining, according to a service type of the service and/or a user indication, a data sending mode for running the data transmission service includes: when the service type of the service and/or the user indication identify/identifies that the service belongs to a non-emergency service, determining that the data sending mode for running the data transmission service is a second sending mode, where the second sending mode is a data sending mode in which a predetermined quantity of packets are sent in each connection event interval, and the connection event interval is a time interval between two connection events.

In a possible design, that the processor performs the operation of running the data transmission service in the determined data sending mode by using the Bluetooth® communications interface includes: determining, in each connection event interval, that a quantity of currently sent packets is less than the predetermined quantity; determining whether a data packet is currently to be sent; and if determining that a data packet is currently to be sent, sending the data packet by using the Bluetooth® communications interface; or if determining that no data packet is currently to be sent, sending an empty packet by using the Bluetooth® communications interface.

In a possible design, that the processor performs the operation of running the data transmission service in the determined data sending mode by using the Bluetooth® communications interface includes: determining, in each connection event interval, that a quantity of currently sent packets is less than the predetermined quantity; determining whether a data packet is currently to be sent; and if determining that a data packet is currently to be sent, sending the data packet by using the Bluetooth® communications interface; or if determining that no data packet is currently to be sent, stopping packet sending in the connection event interval.

In a possible design, that the processor performs the operation of determining, according to a service type of the service and/or a user indication, a data sending mode for running the data transmission service includes: when the service type of the service and/or the user indication identify/identifies that the service belongs to a non-emergency service, determining that the data sending mode for running the data transmission service is a third sending mode, where the third sending mode is a data sending mode in which data packets are constantly sent in each connection event interval, and the connection event interval is a time interval between two connection events.

In a possible design, that the processor performs the operation of running the data transmission service in the determined data sending mode by using the Bluetooth® communications interface includes: determining, in each connection event interval, whether a data packet is currently to be sent; and if determining that a data packet is currently to be sent, sending the data packet by using the Bluetooth® communications interface; or if determining that no data packet is currently to be sent, stopping packet sending in the connection event interval.

According to still another aspect, an embodiment of the present invention provides a communications system. The system includes the data sender terminal and the data receiver terminal according to the foregoing aspects.

According to yet another aspect, an embodiment of the present invention provides a computer storage medium, which is used to store a computer software instruction used by the foregoing terminal. The computer software instruction includes a program designed for executing the foregoing aspects.

Compared with the prior art, in the solutions provided in the embodiments of the present invention, an appropriate data sending mode can be selected according to a service type and/or a user indication. Therefore, a data transmission rate can be effectively increased while terminal power consumption is reduced.

DETAILED DESCRIPTION OF ILLUSTRATIVE EMBODIMENTS

Figure 1:
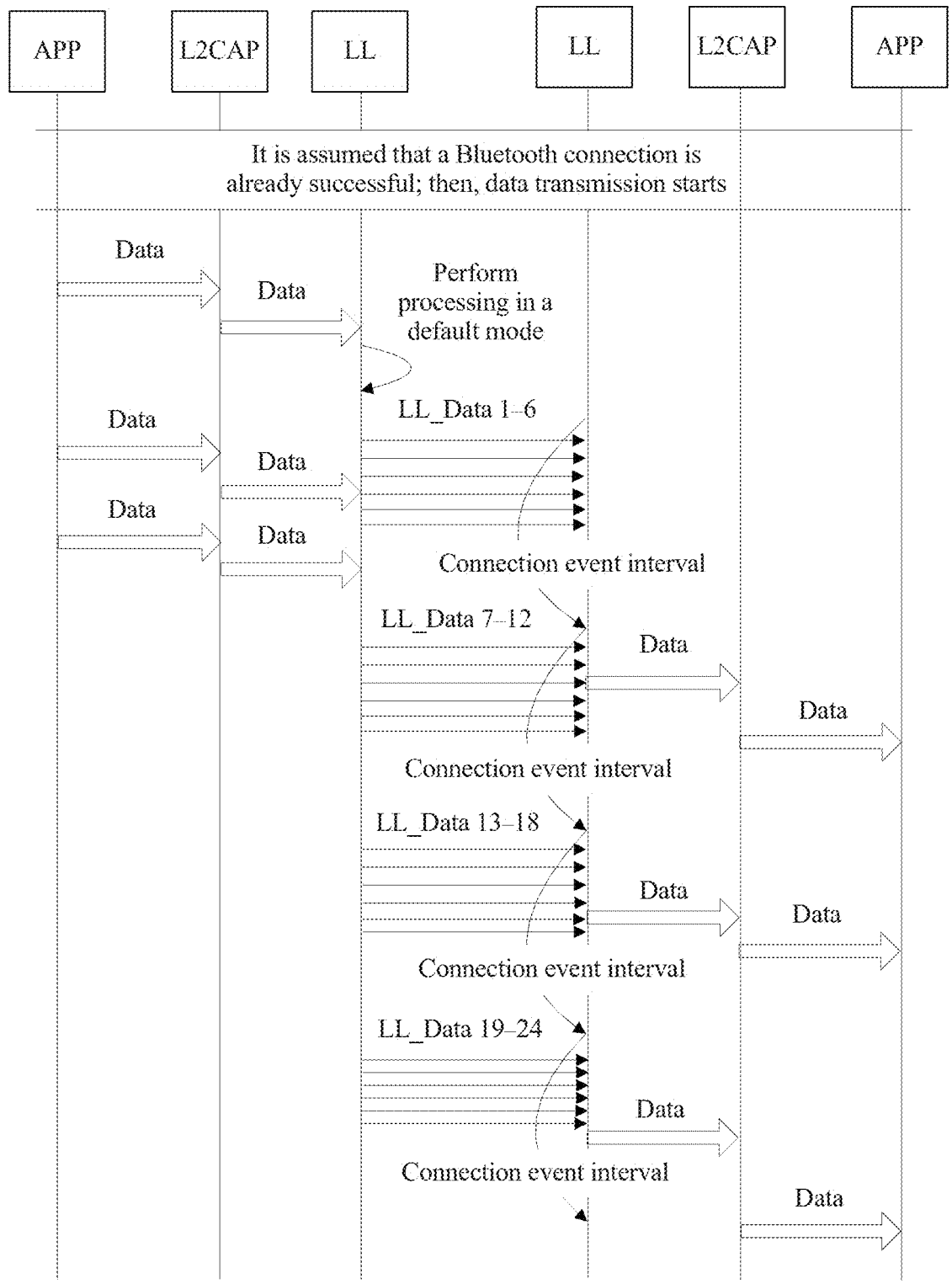
FIG. 1 is a schematic diagram of a typical application scenario of a data sending method in the prior art.

To make the purpose, technical solutions, and advantages of the embodiments of the present invention clearer, the following describes the technical solutions of the embodiments of the present invention with reference to the accompanying drawings in the embodiments of the present invention.

In the embodiments of the present invention, a transmission rate for a low energy short range wireless communication protocol, such as the Bluetooth® Low Energy (BLE) protocol, is optimized according to different service requirements, so as to improve user experience. A Bluetooth® or BLE device or a device that uses Bluetooth® or BLE is a device that uses a short range wireless communications protocol that complies with the Bluetooth® or BLE standard as of the filing of this disclosure. Three modes for event sending in a connection event interval are proposed, so as to implement a customized and flexible rate adjustment method. Automatic and user-involved rate setting mechanisms are provided. Because a frequency hopping mechanism is used for a connection between two BLE devices, the two devices use a specific channel to send and receive data, and then use a new channel after a period of time. That the two devices send and receive data after channel switching is referred to as a connection event. A connection event interval is a time interval between two connection events. The connection event interval is in a unit of 1.25 ms, and a value of the connection event interval is from 6 to 3200. That is, the connection event interval is a time from 7.5 ms to 4 s.

Event sending in a connection event interval is performed in three modes.

A first sending mode is an infinite sending mode. That is, infinite sending of connection events may be set. Even if there is no data, an empty packet may be sent. An MD flag bit in a header is set to 1, indicating that data is to be sent subsequently, so as to prepare for subsequent immediate data sending, until a connection event interval expires.

A second sending mode is a fixed sending mode. That is, a fixed quantity of packet sending times in a connection event interval is set, and data that can be sent in each connection event interval is limited. A quantity of packet sending times in each connection event interval cannot be greater than the fixed quantity of times.

A third sending mode is a best-effort sending mode. That is, in this case, a quantity of packet sending times in a connection event interval is not set. In this mode, data is constantly sent until the connection event interval expires, provided that the BLE device has data. Different from the infinite sending mode, when the BLE device has no data, no empty packet is sent, and event sending in a connection event interval ends, to wait for arrival of a next connection event interval.

In the embodiments of the present invention, it is possible that multiple services need to be processed concurrently. Therefore, when there is a high-priority service, for example, when a BLE protocol is used to run a data transmission service but a service transmitted in a basic rate (Basic Rate, BR) mode, one of conventional Bluetooth® transmission modes, has started, if it is pre-configured that a priority of a service with data transmission performed in the BR mode is higher than that of a service with data transmission performed by using the BLE protocol, event sending in a connection event interval immediately ends, and the service with data transmission performed in the BR mode starts to be invoked.

Figure 2:
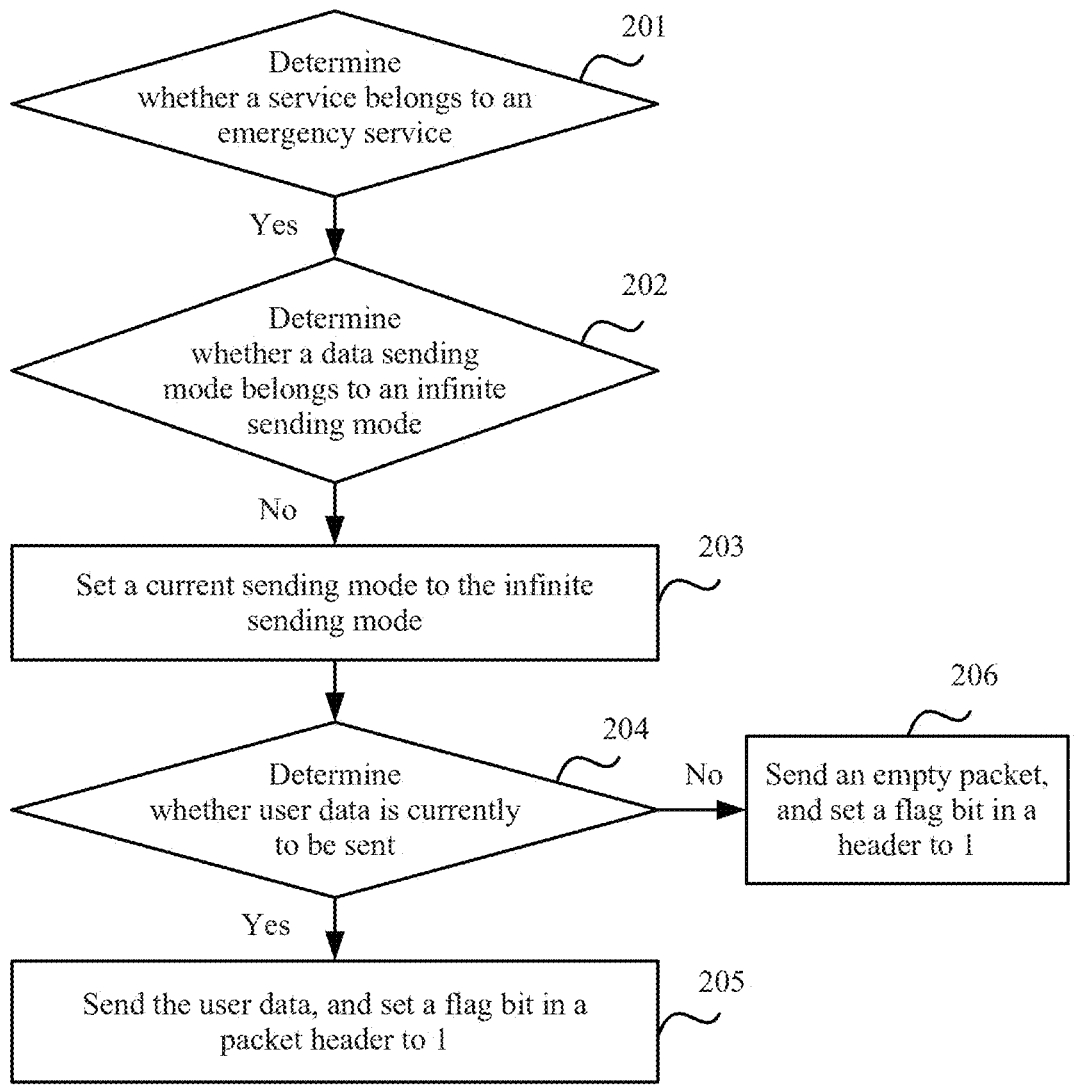
FIG. 2 is a flowchart of a data sending method according to an embodiment of the present invention.

FIG. 2 is a flowchart of a data sending method according to an embodiment of the present invention. The method may be executed by a terminal that supports a BLE protocol. The terminal may also be referred to as a BLE device. Referring to FIG. 2, the method includes the following steps.

Step 201: When a BLE protocol is used to run a data transmission service, determine whether the service belongs to an emergency service.

Whether the service belongs to an emergency service may be determined in manners including but not limited to the following two manners: determining whether the service belongs to an emergency service according to a service type of the service; and prompting a user to select a transmission mode, and determining whether the service belongs to an emergency service according to the transmission mode selected by the user.

In this embodiment of the present invention, at least one service type corresponding to an emergency service may be preset. When the service type of the service is identified to belong to the service type corresponding to the emergency service, it is determined that the service belongs to the emergency service. The service type of the service may be identified according to a name of the data transmission service, a name and a name extension of a file transmitted by the service, or a service type field carried in a header of a packet transmitted by the service.

Step 202: When it is determined that the service belongs to the emergency service, determine whether a current sending mode is an infinite sending mode.

Step 203: If the current sending mode is not the infinite sending mode, set the current sending mode to the infinite sending mode.

Step 204: Determine whether user data is currently to be sent in each connection event interval.

Step 205: If it is determined that user data is currently to be sent, send the user data, and set a flag bit in a packet header to 1, where the flag bit 1 is used indicate that data is to be sent subsequently.

Step 206: If it is determined that no user data is currently to be sent, send an empty packet, and set a flag bit in a header to 1.

In this embodiment of the present invention, when the data transmission service is completed, the current sending mode may be restored from the infinite sending mode to a preset sending mode. Generally, the preset sending mode is set for a non-emergency service. Therefore, the preset sending mode includes a fixed sending mode and a best-effort sending mode.

In addition, when it is determined that the service belongs to a non-emergency service in step 201, user data is sent in the current sending mode. In this case, no sending mode needs to be re-set.

The current sending mode may be at least one of the infinite sending mode, the fixed sending mode, or the best-effort sending mode.

If the current sending mode is the infinite sending mode, user data is sent by using the method in step 204 to step 206.

Figure 3:
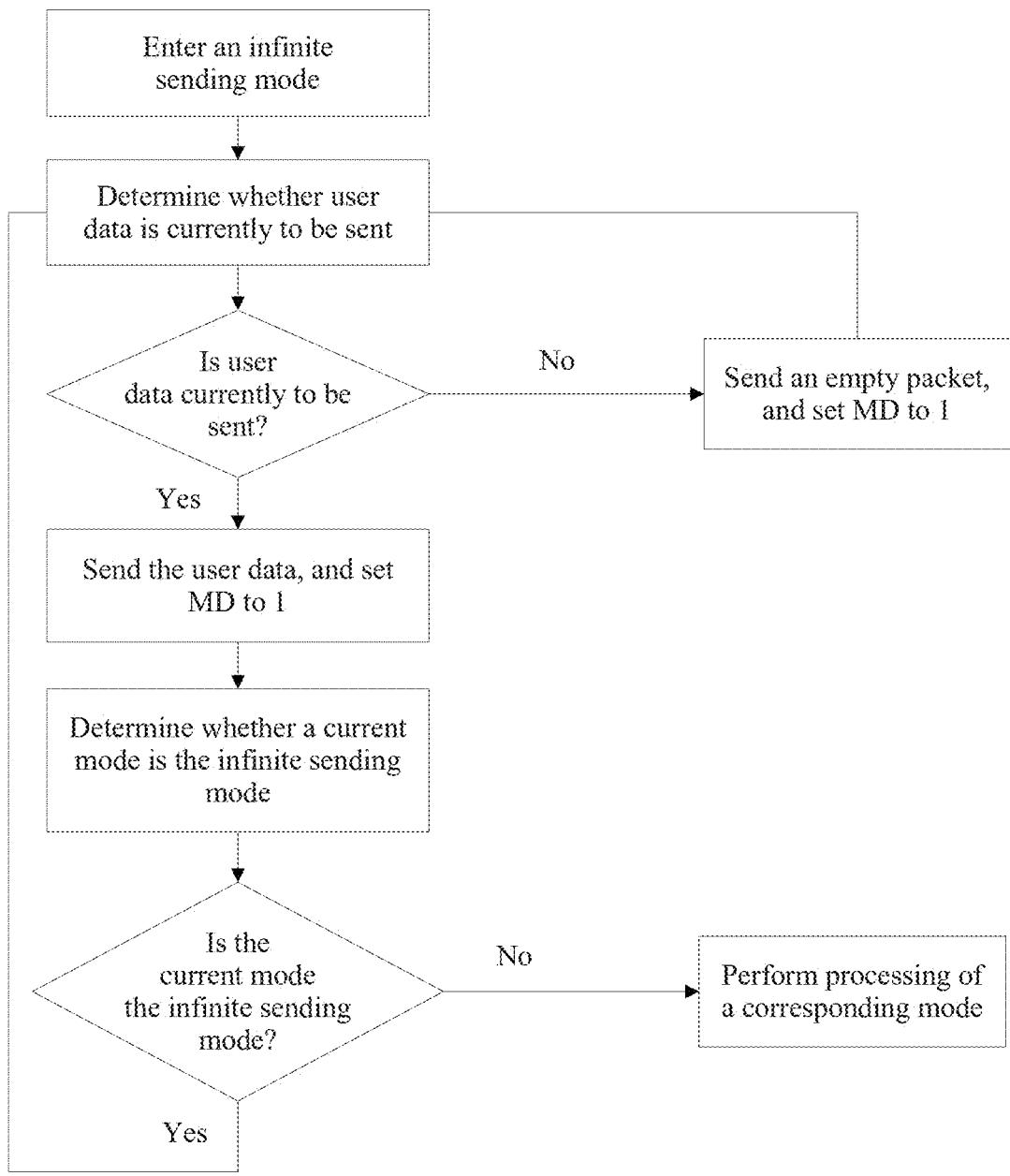
FIG. 3 is a flowchart of processing in an infinite sending mode according to an embodiment of the present invention.

To more clearly describe a processing procedure of the infinite sending mode, in a specific embodiment of the present invention, a processing procedure shown in FIG. 3 is used. Referring to FIG. 3, before each connection event interval starts, it needs to be determined whether the current sending mode is the infinite sending mode, so as to avoid unnecessary power consumption caused from constantly using the infinite sending mode.

Figure 4:
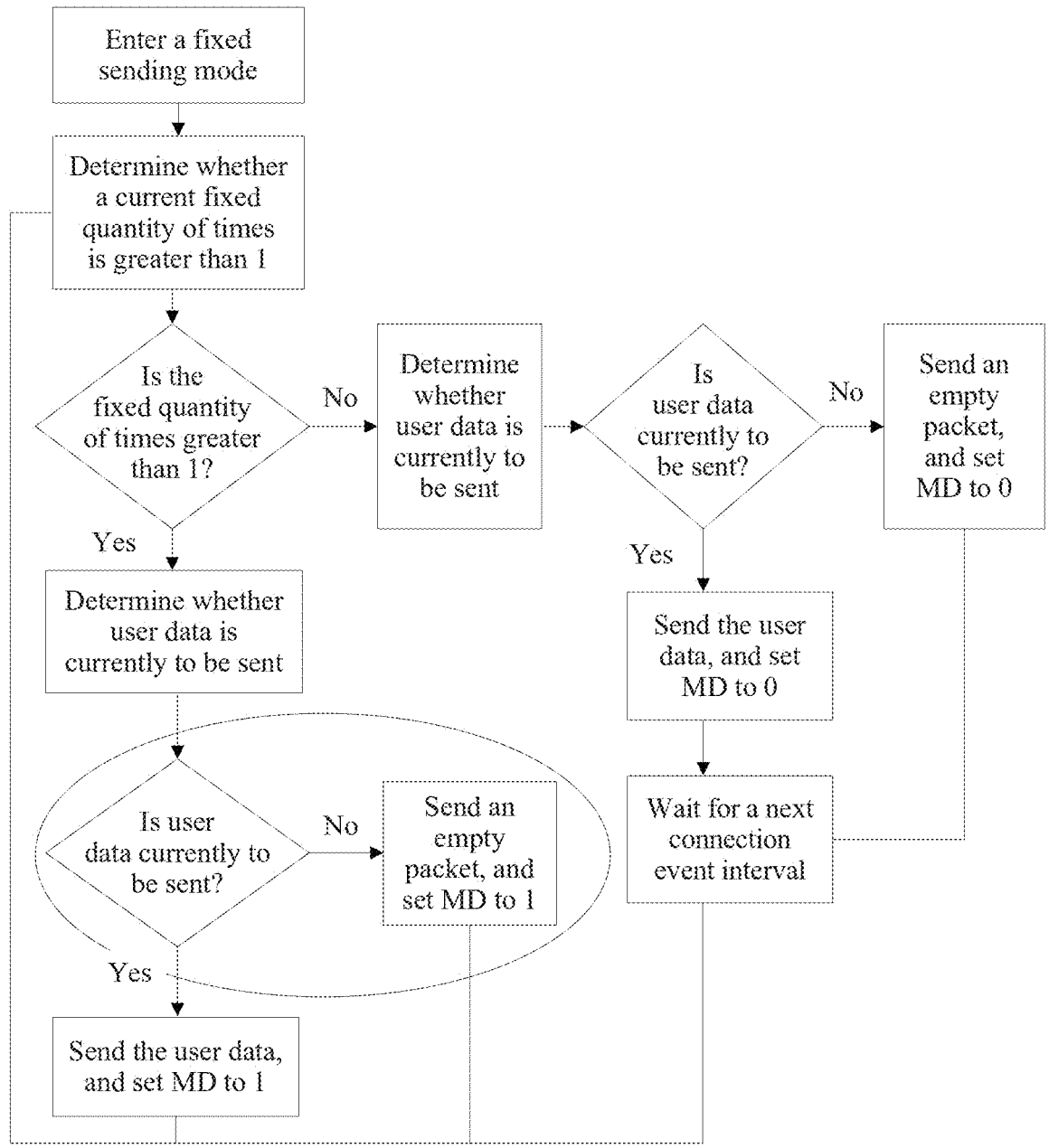
FIG. 4 is a flowchart of processing in a fixed sending mode according to an embodiment of the present invention.

If the current sending mode is the fixed sending mode, a data sending method shown in FIG. 4 is used to send user data. Referring to FIG. 4, the method includes:

Step 401: When the current sending mode is the fixed sending mode, determine, in each connection event interval, whether a remaining quantity of sending times in each connection event interval is greater than 1 according to a fixed quantity of sending times in the fixed sending mode.

Step 402: When it is determined that the remaining quantity of sending times is greater than 1, determine whether user data is currently to be sent.

Step 403: If it is determined that user data is currently to be sent, send the user data, and set a flag bit in a packet header to 1.

Step 404: If it is determined that no user data is currently to be sent, send an empty packet, and set a flag bit in a header to 1.

Optionally, the method further includes:

Step 405: When it is determined that the remaining quantity of sending times is equal to 1, determine whether user data is currently to be sent.

Step 406: If it is determined that user data is currently to be sent, send the user data, and set a flag bit in a packet header to 0, where the flag bit 0 is used to indicate that no data is to be sent subsequently.

Step 407: If it is determined that no user data is currently to be sent, send an empty packet, and set a flag bit in a packet header to 0.

The processing manner in step 404 may be replaced with another processing manner. For example, when no user data is to be sent, a flag bit in a header of the last data packet is set to 0, and/or a fixed quantity of sending times in this connection event interval may be directly set to 0. In this way, an action of sending an empty packet may be omitted.

Figure 5:
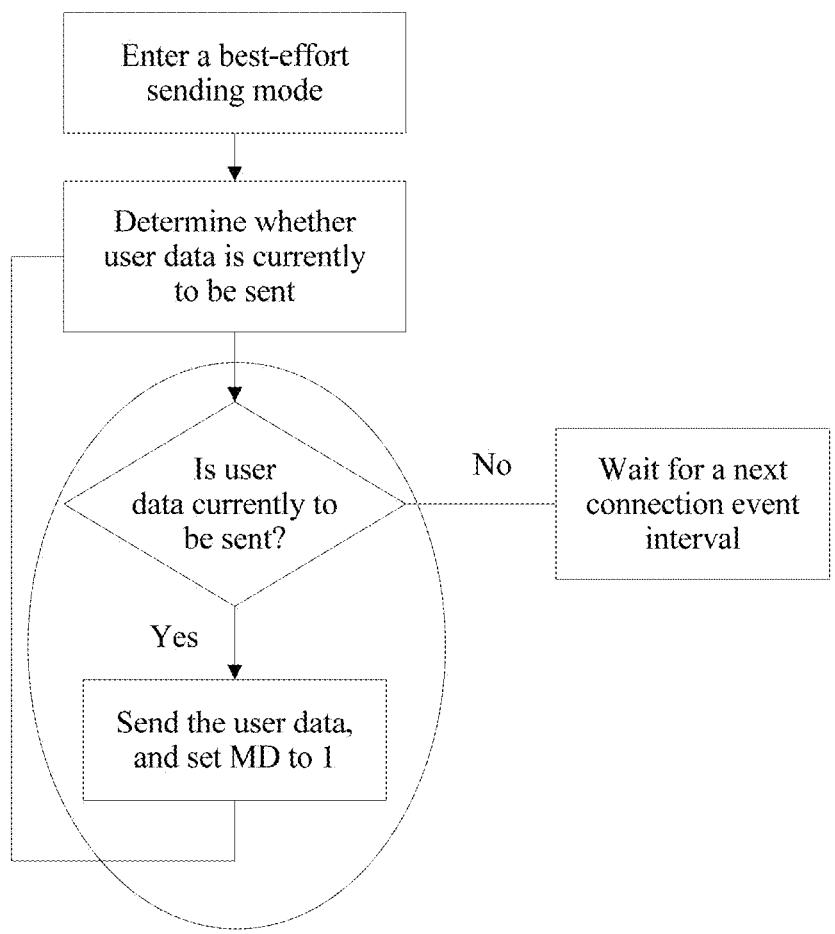
FIG. 5 is a flowchart of processing in a best-effort sending mode according to an embodiment of the present invention.

If the current sending mode is the best-effort sending mode, a data sending method shown in FIG. 5 is used to send user data. Referring to FIG. 5, the method includes:

Step 501: When the current sending mode is the best-effort sending mode, determine, in each connection event interval according to the best-effort sending mode, whether user data is currently to be sent.

Step 502: If it is determined that user data is currently to be sent, send the user data, and set a flag bit in a packet header to 1.

Step 503: If it is determined that no user data is currently to be sent, wait for a next connection event interval.

It needs to be noted herein that, FIG. 5 is a processing overview, and a part marked by an ellipse in the figure indicates that MD is set to 1 if data is to be sent subsequently. If no data is to be sent subsequently, MD is set to 0 in a last piece of data.

According to the data sending method provided in this embodiment of the present invention, when a BLE protocol is used to run a data transmission service, it is determined whether the service belongs to an emergency service, so as to send data in an infinite sending mode for the service that belongs to an emergency service. Even if there is no data, an empty packet needs to be sent, and a flag bit in a header is set to 1. The flag bit 1 is used to indicate that data is to be sent subsequently, so as to prepare for subsequent immediate data sending, until a connection event interval expires. Therefore, a data transmission rate can be effectively increased while terminal power consumption is reduced.

In this embodiment of the present invention, an event sending mode may be automatically selected according to different service types. The event sending mode has a same meaning as a data sending mode, and service types may be properly classified by a product developer according to different product requirements. For example, services are classified into an emergency service and a non-emergency service. (1) Emergency service: an upgrade package transmission service, a preset configuration file transmission service of a built-in app, a data transmission service with a data file size generally greater than 5 M, and the like. (2) Non-emergency service: a service other than emergency services.

Figure 6:
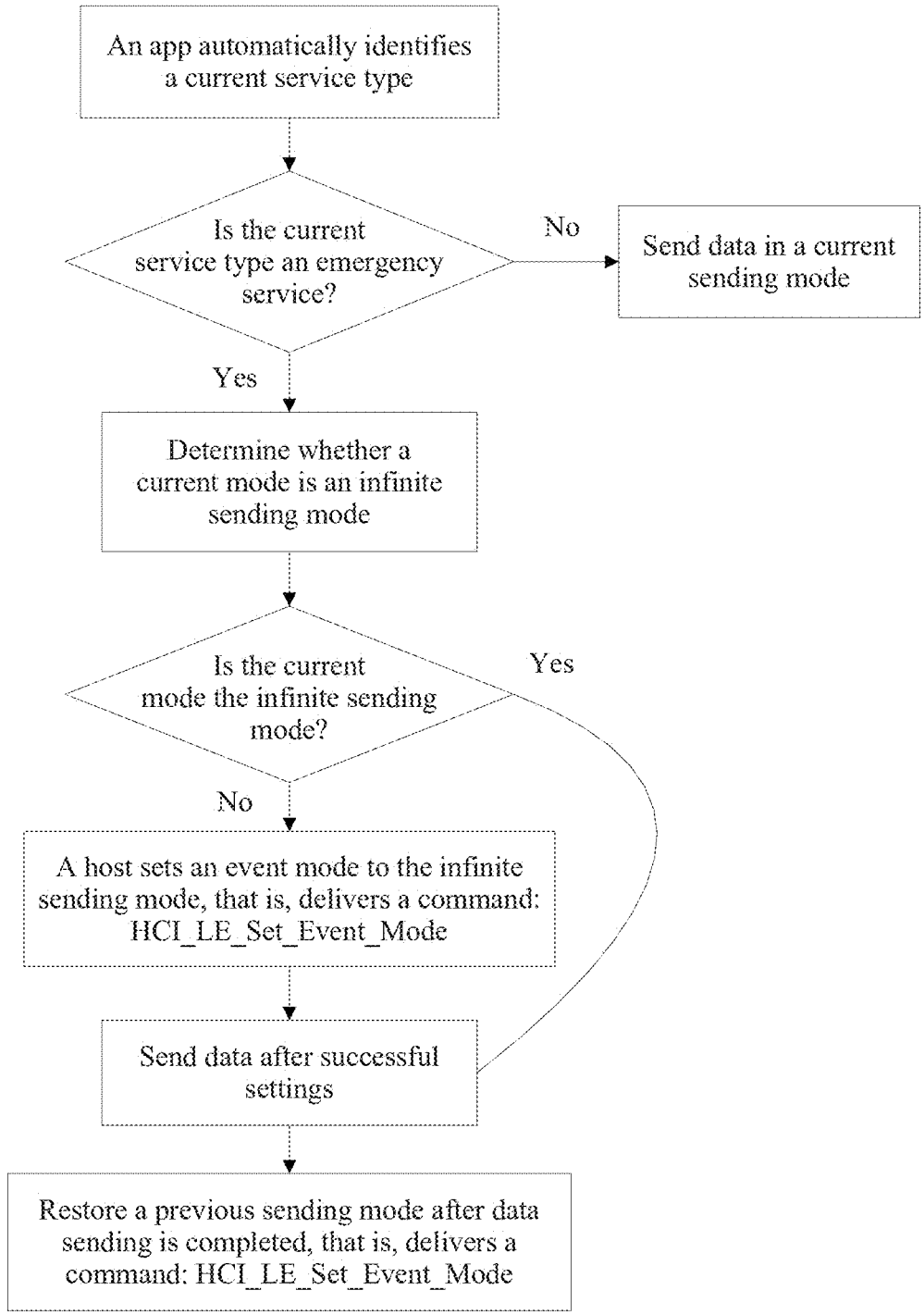
FIG. 6 is a flowchart of a data sending method according to another embodiment of the present invention.

FIG. 6 is a flowchart of a data sending method according to an embodiment of the present invention. In this method, an event sending mode is automatically selected according to different service types. Referring to FIG. 6, that an upgrade package is to be sent is used as an example. Because sending of an upgrade package is purpose-specific data transmission, a relatively high transmission rate is required. An app can identify a service type of the service, and determine that the service is an emergency service according to the identified service type. For this service, a sending mode is directly set to an infinite sending mode. After transmission of the upgrade package is completed, the current sending mode is restored to a previous sending mode. For a specific transmission process, refer to a schematic diagram of a transmission process shown in FIG. 7A and FIG. 7B.

Figure 7A:
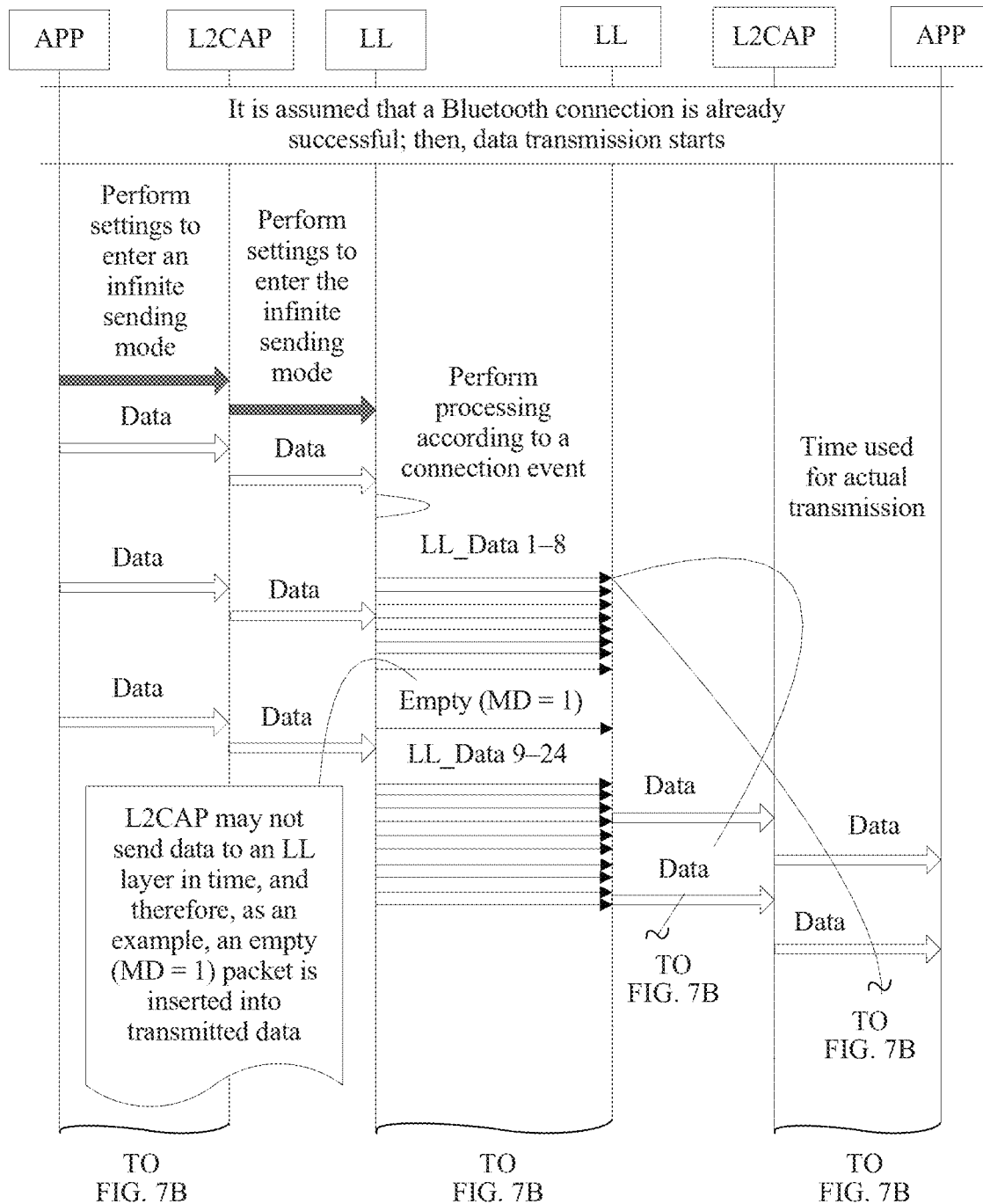
FIG. 7A and FIG. 7B are a schematic diagram of a transmission process according to an embodiment of the present invention.
Figure 7B:
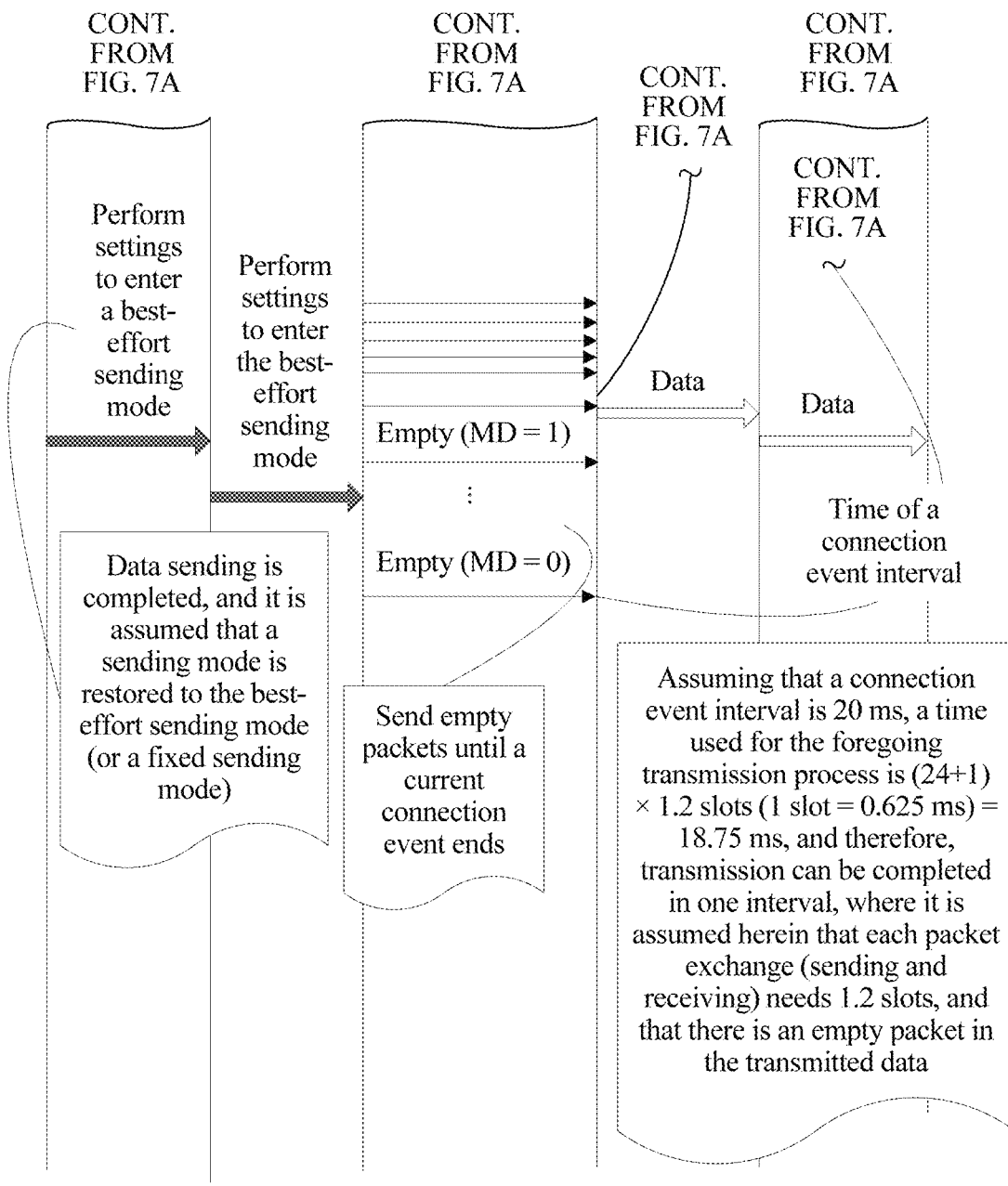

Referring to FIG. 7A and FIG. 7B, a formula for calculating a time required by transmission is provided: $(24+1)\times 1.2$ slots (1 slot=0.625 ms)=18.75 ms. In the formula, 24 indicates 24 pieces of valid user data, and 1 represents one empty packet. 1.2 slots represents a time required for sending one piece of data (including an answer acknowledgment message of a peer device). 0.625 represents a time length (unit: ms) of one slot. This is a general calculation formula, and is merely intended to indicate an effect obtained by using the present invention. In practice, different effects may be generated because of different product implementations. FIG. 7A and FIG. 7B show only a case in which all data is sent in one connection event interval. In practice, according to different data volumes, multiple connection event intervals may be required for completing data sending. In FIG. 7A and FIG. 7B, when data sending is completed, but a connection event interval does not expire, an empty packet is sent to the peer, until the interval expires. However, it should be noted that if a current mode is already changed to another mode (for example, a best-effort mode), sending of the empty packet is stopped (MD in the current empty packet is set to 0), and empty packets do not need to be constantly sent.

Figure 8:
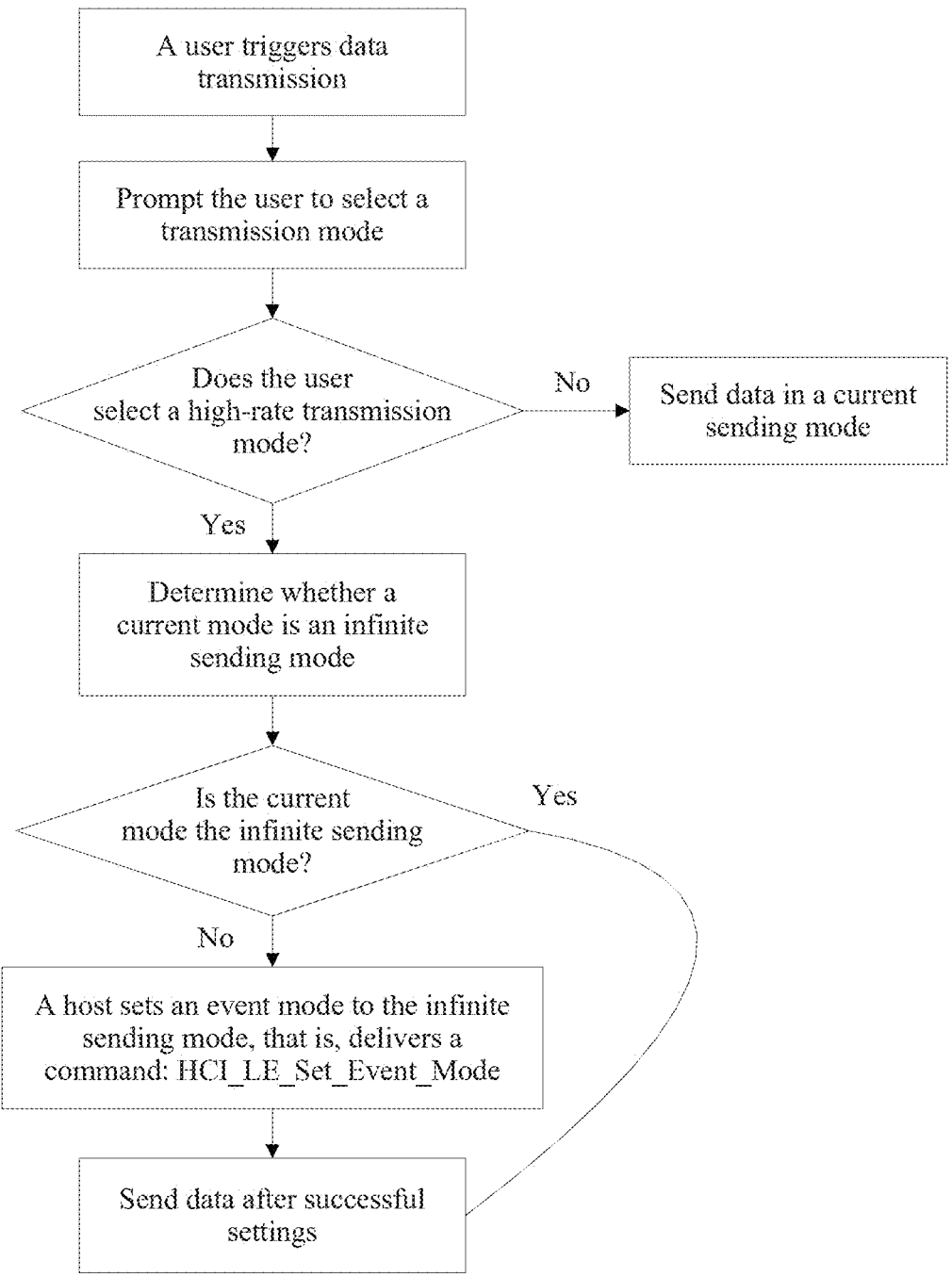
FIG. 8 is a flowchart of a data sending method according to another embodiment of the present invention.

FIG. 8 is a flowchart of a data sending method according to an embodiment of the present invention. In this method, a user may voluntarily select an event sending mode according to a service requirement. Referring to FIG. 8, in this embodiment of the present invention, an interface is provided to so that the user selects different sending modes. Only a high-rate mode and a low-rate mode may be displayed to the user for selection, and may be internally mapped to different sending modes. For example, when the user selects the high-rate mode, data is sent in an infinite sending mode, or when the user selects the low-rate mode, data is sent in a current sending mode. The current sending mode may be any one of the infinite sending mode, a fixed sending mode, or a best-effort sending mode.

Bluetooth® devices may be classified into a master (Master) and a slave (Slave) according to roles of the Bluetooth® devices in a network. The above describes a case in which a master sends data to a slave. When a slave sends data to a master, a same effect may be implemented, provided that the slave sends the data in different sending modes.

To implement direct switching between the three sending modes, a manner of implementing switching by using an HCI command is proposed herein. Certainly, switching may be implemented in another manner. This is not specifically limited in this embodiment of the present invention. In a specific embodiment of the present invention, an HCI command of a vendor-specific (Vendor-specific, VS) debug command is used to instruct a controller (controller) to enter a specific sending mode to work. The current sending mode may be changed at any time by using the HCI command, so as to enter another sending mode.

In an example, a format of the VS command is given below:

| Command | OCF | Command parameter | Return parameter |
|---|---|---|---|
| HCI_LE_Set_Event_Mode | 0xXX | Connection_event_mode | status |

Command: represents a name of the HCI command.

OCF: OpCode Command Field, which represents a command number of the HCI command.

Command parameter: represents a parameter carried during a delivery of the HCI command.

Return parameter: represents a return parameter of the HCI command.

A user-defined HCI command has the following fields:

| HCI_LE_Set_Event_Mode (5 Octets) | | |
|---|---|---|
| Filed | | Value |
| bit0:bit9 | OCF | 0xXX |
| bit10:bit15 | OGF | 0x3F (HCI debug commands group) |
| bit16:bit23 | Parameter Length | 2 |
| bit24:bit31 | Parameters | Sending mode settings. Specific values are as follows: 0x00: Fixed sending mode 0x01: Infinite sending mode 0x02: Best-effort sending mode |
| bit32:bit39 | Reserved Parameters | 0xXX (a quantity of packet sending times in the fixed sending mode) |

OGF: OpCode Group Field, which represents a command group number of the HCI command.

bitx: represents a value of each bit in the HCI command.

Command return event: A command return event in this embodiment of the present invention is a reply about a processing status to the user-defined command HCI_LE_Set_Event_Mode, indicating that processing of the command is completed. A standard command complete event is used.

| Value | Description |
|---|---|
| | Command Opcode (Size: 2 Octets) |
| 0xXXXX | Opcode of HCI_LE_Set_Event_Mode Status (Size: 2 Octets) |
| 0xXX | Command return parameter (status) of the HCI_LE_Set_Event_Mode command 0x00: A specified event mode is successfully set. 0x01: A specified event mode fails to be set. 0x02-0xFF: A command parameter is not allowed. |

In conclusion, when a terminal needs to set a sending mode, the command is delivered for setting a sending mode. After a service is completed, the current sending mode may be restored to a previous sending mode.

According to the data sending method provided in this embodiment of the present invention, a BLE data transmission rate may be increased or reduced according to different service requirements, so that a key service gains a higher rate, thereby improving user experience. A customized and flexible rate adjustment method is provided, and free switching can be performed between sending modes. In a process of running a data transmission service, a data sending mode can be changed according to a user indication. When multiple transmission services run at the same time, it can be determined, according to a service type or a user indication, that the data transmission services can run in an infinite sending mode, provided that there is an emergency service. Automatic and user-involved rate setting mechanisms are provided, so that more options are provided for a user, and the user can be more aware of Bluetooth® transmission characteristics. Therefore, better user experience is provided.

Figure 9:
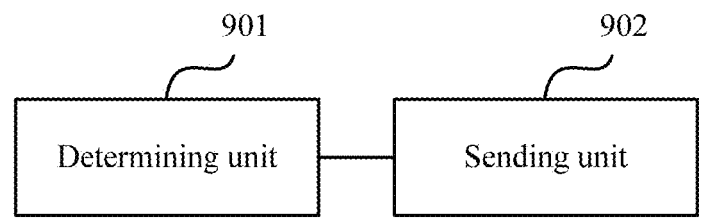
FIG. 9 is a structural diagram of a data sending apparatus according to an embodiment of the present invention.

FIG. 9 is a structural diagram of a data sending apparatus according to an embodiment of the present invention. The apparatus is configured to execute the data sending methods provided in the embodiments of the present invention. Referring to FIG. 9, the apparatus includes a determining unit 901 and a sending unit 902.

The determining unit 901 is configured to: when a BLE protocol is used to run a data transmission service, determine, according to a service type of the service and/or a user indication, a data sending mode for running the data transmission service.

The sending unit 902 is configured to run the data transmission service in the data sending mode determined by the determining unit 901.

Optionally, the determining unit 901 is specifically configured to: when the BLE protocol is used to run the data transmission service and when the service type of the service and/or the user indication identify/identifies that the service belongs to an emergency service, determine that the data sending mode for running the data transmission service is a first sending mode, where the first sending mode is a data sending mode in which packets are constantly sent in each connection event interval, and the connection event interval is a time interval between two connection events.

Optionally, the sending unit 902 includes a judging subunit, configured to determine, in each connection event interval, whether a data packet is currently to be sent, and a sending subunit, configured to, when the judging subunit determines that a data packet is currently to be sent, send the data packet, or when the judging subunit determines that no data packet is currently to be sent, send an empty packet.

Optionally, the determining unit 901 is specifically configured to: when the BLE protocol is used to run the data transmission service and when the service type of the service and/or the user indication identify/identifies that the service belongs to a non-emergency service, determine that the data sending mode for running the data transmission service is a second sending mode, where the second sending mode is a data sending mode in which a predetermined quantity of packets are sent in each connection event interval, and the connection event interval is a time interval between two connection events.

Optionally, the sending unit 902 includes a determining subunit, configured to determine, in each connection event interval, that a quantity of currently sent packets is less than the predetermined quantity, a judging subunit, configured to determine whether a data packet is currently to be sent, and a sending subunit, configured to, when the judging subunit determines that a data packet is currently to be sent, send the data packet, or when the judging subunit determines that no data packet is currently to be sent, send an empty packet.

Optionally, the sending unit 902 includes a determining subunit, configured to determine, in each connection event interval, that a quantity of currently sent packets is less than the predetermined quantity, a judging subunit, configured to determine whether a data packet is currently to be sent, and a sending subunit, configured to: when the judging subunit determines that a data packet is currently to be sent, send the data packet; or when the judging subunit determines that no data packet is currently to be sent, stop packet sending in the connection event interval.

Optionally, the determining unit 901 is specifically configured to: when the BLE protocol is used to run the data transmission service and when the service type of the service and/or the user indication identify/identifies that the service belongs to a non-emergency service, determine that the data sending mode for running the data transmission service is a third sending mode, where the third sending mode is a data sending mode in which data packets are constantly sent in each connection event interval, and the connection event interval is a time interval between two connection events.

Optionally, the sending unit 902 includes a judging subunit, configured to determine, in each connection event interval, whether a data packet is currently to be sent, and a sending subunit, configured to, when the judging subunit determines that a data packet is currently to be sent, send the data packet, or when the judging subunit determines that no data packet is currently to be sent, stop packet sending in the connection event interval.

Figure 10:
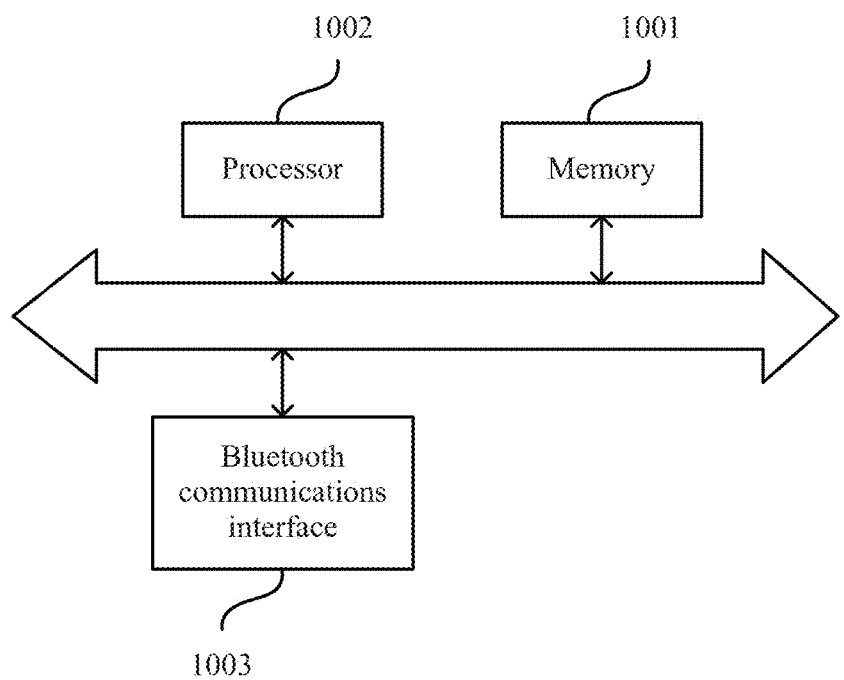
FIG. 10 is a structural diagram of a terminal according to an embodiment of the present invention.

FIG. 10 is a structural diagram of a terminal according to an embodiment of the present invention. The terminal is configured to execute the data sending methods provided in the embodiments of the present invention. Referring to FIG. 10, the terminal includes a memory 1001, a processor 1002, and a Bluetooth® communications interface 1003.

The memory 1001 is configured to store a program instruction.

The processor 1002 is configured to perform the following operations based on the program instruction stored in the memory 1001. The operations include performing, when a BLE protocol is used to run a data transmission service, determining, according to a service type of the service and/or a user indication, a data sending mode for running the data transmission service, and running the data transmission service in the determined data sending mode by using the Bluetooth® communications interface 1003.

Optionally, that the processor 1002 performs the operation of determining, according to a service type of the service and/or a user indication, a data sending mode for running the data transmission service includes, when the service type of the service and/or the user indication identify/identifies that the service belongs to an emergency service, determining that the data sending mode for running the data transmission service is a first sending mode, where the first sending mode is a data sending mode in which packets are constantly sent in each connection event interval, and the connection event interval is a time interval between two connection events.

Optionally, the processor 1002 performs the operation of running the data transmission service in the determined data sending mode by using the Bluetooth® communications interface 1003 includes determining, in each connection event interval, whether a data packet is currently to be sent, and if determining that a data packet is currently to be sent, sending the data packet by using the Bluetooth® communications interface 1003; or if determining that no data packet is currently to be sent, sending an empty packet by using the Bluetooth® communications interface 1003.

Optionally, that the processor 1002 performs the operation of determining, according to a service type of the service and/or a user indication, a data sending mode for running the data transmission service includes when the service type of the service and/or the user indication identify/identifies that the service belongs to a non-emergency service, determining that the data sending mode for running the data transmission service is a second sending mode, where the second sending mode is a data sending mode in which a predetermined quantity of packets are sent in each connection event interval, and the connection event interval is a time interval between two connection events.

Optionally, the processor 1002 performs the operation of running the data transmission service in the determined data sending mode by using the Bluetooth® communications interface 1003 includes determining, in each connection event interval, that a quantity of currently sent packets is less than the predetermined quantity, determining whether a data packet is currently to be sent, and if determining that a data packet is currently to be sent, sending the data packet by using the Bluetooth® communications interface 1003; or if determining that no data packet is currently to be sent, sending an empty packet by using the Bluetooth® communications interface 1003.

Optionally, the processor 1002 performs the operation of running the data transmission service in the determined data sending mode by using the Bluetooth® communications interface 1003 includes determining, in each connection event interval, that a quantity of currently sent packets is less than the predetermined quantity, determining whether a data packet is currently to be sent, and if determining that a data packet is currently to be sent, sending the data packet by using the Bluetooth® communications interface 1003; or if determining that no data packet is currently to be sent, stopping packet sending in the connection event interval.

Optionally, that the processor 1002 performs the operation of determining, according to a service type of the service and/or a user indication, a data sending mode for running the data transmission service includes when the service type of the service and/or the user indication identify/identifies that the service belongs to a non-emergency service, determining that the data sending mode for running the data transmission service is a third sending mode, where the third sending mode is a data sending mode in which data packets are constantly sent in each connection event interval, and the connection event interval is a time interval between two connection events.

Optionally, the processor 1002 performs the operation of running the data transmission service in the determined data sending mode by using the Bluetooth® communications interface includes determining, in each connection event interval, whether a data packet is currently to be sent, and if determining that a data packet is currently to be sent, sending the data packet by using the Bluetooth® communications interface 1003; or if determining that no data packet is currently to be sent, stopping packet sending in the connection event interval.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory (non-transitory) medium, such as a random-access memory, read-only memory, a flash memory, a hard disk, a solid state drive, a magnetic tape (magnetic tape), a floppy disk (floppy disk), an optical disc (optical disc), or any combination thereof.

The foregoing descriptions are merely example implementation of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for sending data, wherein the method comprises:
   determining, when a low energy short range wireless communication protocol is used to run a data transmission service, and according to whether at least one of a service type of the data transmission service identifies that the data transmission service belongs to an emergency service or a user indication identifies that the data transmission service belongs to the emergency service, a data sending mode for running the data transmission service, wherein the service type of the data transmission service is identified according to a name of the data transmission service or according to a filename or extension name of a file transmitted by the data transmission service, and wherein the emergency service comprises an upgrade package transmission service, a preset configuration file transmission service of an application, or a data transmission service with a data file size greater than a first threshold;
   providing, in response to determining the data sending mode for running the data transmission service, a vendor-specific debug command instructing a controller to enter the determined data sending mode; and
   running the data transmission service in the determined data sending mode.

2. The method according to claim 1, wherein the determining the data sending mode for running the data transmission service comprises:
   determining that the data sending mode for running the data transmission service is a first sending mode in response to the at least one of the service type of the data transmission service identifying that the data transmission service belongs to the emergency service or the user indication identifying that the data transmission service belongs to the emergency service, wherein the first sending mode is a data sending mode in which packets are constantly sent in each connection event interval, wherein the connection event interval is a time interval between two connection events.

3. The method according to claim 2, wherein the running the data transmission service in the determined data sending mode comprises:
   determining, in each connection event interval, whether a data packet is to be sent;
   sending the data packet in response to determining that the data packet is to be sent; and
   sending an empty packet in response to determining that no data packet is to be sent.

4. The method according to claim 1, wherein the determining the data sending mode for running the data transmission service comprises:
   determining that the data sending mode for running the data transmission service is a second sending mode in response to at least one of the service type of the data transmission service or the user indication identifying that the data transmission service belongs to a non-emergency service, wherein the second sending mode is a data sending mode in which a predetermined quantity of packets are sent in each connection event interval, and wherein the connection event interval is a time interval between two connection events.

5. The method according to claim 4, wherein the running the data transmission service in the determined data sending mode comprises:
   determining, in each connection event interval, that a quantity of sent packets is less than the predetermined quantity of packets;
   determining whether a data packet is to be sent;
   sending the data packet in response to determining that the data packet is to be sent; and
   sending an empty packet in response to determining that no data packet is to be sent.

6. The method according to claim 4, wherein the running the data transmission service in the determined data sending mode comprises:

determining, in each connection event interval, that a quantity of sent packets is less than the predetermined quantity of packets;

determining whether a data packet is to be sent;

sending the data packet in response to determining that the data packet is to be sent; and stopping packet sending in the connection event interval in response to determining that no data packet is currently to be sent.

7. The method according to claim 1, wherein the determining the data sending mode for running the data transmission service comprises:

determining that the data sending mode for running the data transmission service is a third sending mode in response to at least one of the service type of the data transmission service or the user indication identifying that the data transmission service belongs to a non-emergency service, wherein the third sending mode is a data sending mode in which data packets are constantly sent in each connection event interval, and wherein the connection event interval is a time interval between two connection events.

8. The method according to claim 7, wherein the running the data transmission service in the determined data sending mode comprises:

determining, in each connection event interval, whether a data packet is to be sent;

sending the data packet in response to determining that the data packet is to be sent; and stopping packet sending in the connection event interval in response to determining that no data packet is to be sent.

9. The method according to claim 1, wherein the low energy short range wireless communication protocol is a Bluetooth® Low Energy (BLE) protocol.

10. A terminal, comprising:

a short range wireless communications interface;

a processor; and a non-transitory computer-readable storage medium storing a program to be executed by the processor, the program including instructions to:

determine, according to whether at least one of a service type of a data transmission service identifies that the data transmission service belongs to an emergency service or a user indication identifies that the data transmission service belongs to the emergency service, a data sending mode for running the data transmission service, wherein the service type of the data transmission service is identified according to a name of the data transmission service or according to a filename or extension name of a file transmitted by the data transmission service, and wherein the emergency service comprises an upgrade package transmission service, a preset configuration file transmission service of an application, or a data transmission service with a data file size greater than a first threshold;

provide, in response to determining the data sending mode for running the data transmission service, a vendor-specific debug command instructing a controller to enter the determined data sending mode; and run the data transmission service in the determined data sending mode using the short range wireless communications interface.

11. The terminal according to claim 10, wherein the instructions to determine the data sending mode for running the data transmission service include instructions to:

determine that the data sending mode for running the data transmission service is a first sending mode in response to the at least one of the service type of the data transmission service identifying that the data transmission service belongs to the emergency service or the user indication identifying that the data transmission service belongs to the emergency service, wherein the first sending mode is a data sending mode in which packets are constantly sent in each connection event interval, and wherein the connection event interval is a time interval between two connection events.

12. The terminal according to claim 11, wherein the instructions to run the data transmission service in the determined data sending mode using the short range wireless communications interface include instructions to:

determine, in each connection event interval, whether a data packet is to be sent; and send the data packet using the short range wireless communications interface in response to determining that the data packet is to be sent; and send an empty packet using the short range wireless communications interface in response to determining that no data packet is to be sent.

13. The terminal according to claim 10, wherein the instructions to determine the data sending mode for running the data transmission service include instructions to:

determine that the data sending mode for running the data transmission service is a second sending mode in response to at least one of the service type of the data transmission service or the user indication identifying that the data transmission service belongs to a non-emergency service, wherein the second sending mode is a data sending mode in which a predetermined quantity of packets are sent in each connection event interval, and wherein the connection event interval is a time interval between two connection events.

14. The terminal according to claim 13, wherein the instructions to run the data transmission service in the determined data sending mode using the short range wireless communications interface include instructions to:

determine, in each connection event interval, that a quantity of sent packets is less than the predetermined quantity of packets;

determine whether a data packet is to be sent; and send the data packet using the short range wireless communications interface in response to determining that the data packet is to be sent.

15. The terminal according to claim 13, wherein the instructions to run the data transmission service in the determined data sending mode using the short range wireless communications interface include instructions to:

determining, in each connection event interval, that a quantity of sent packets is less than the predetermined quantity of packets;

determining whether a data packet is currently to be sent; and sending an empty packet using the short range wireless communications interface in response to determining that no data packet is to be sent.

16. The terminal according to claim 13, wherein the instructions to run the data transmission service in the determined data sending mode using the short range wireless communications interface include instructions to:

determine, in each connection event interval, that a quantity of sent packets is less than the predetermined quantity of packets;

determine whether a data packet is to be sent;

send the data packet using the short range wireless communications interface in response to determining that a data packet is currently to be sent; and stop packet sending in the connection event interval in response to determining that no data packet is currently to be sent.

17. The terminal according to claim 10, wherein the instructions to determine the data sending mode for running the data transmission service include instructions to:

determine that the data sending mode for running the data transmission service is a third sending mode in response to at least one of the service type of the data transmission service or the user indication identifying that the data transmission service belongs to a non-emergency service, wherein the third sending mode is a data sending mode in which data packets are constantly sent in each connection event interval, and wherein the connection event interval is a time interval between two connection events.

18. The terminal according to claim 17, wherein the instructions to run the data transmission service in the determined data sending mode using the short range wireless communications interface include instructions to:

determine, in each connection event interval, whether a data packet is to be sent; and send the data packet using the short range wireless communications interface in response to determining that a data packet is to be sent; and stop packet sending in the connection event interval in response to determining that no data packet is currently to be sent.

19. The terminal according to claim 10, wherein the short range wireless communications interface is a Bluetooth® interface.

20. A non-transitory computer-readable storage medium storing a program for execution by a processor, the program including instructions to:

determine a data sending mode for running a data transmission service using a low energy short range wireless communication protocol according to whether at least one of a service type of the data transmission service identifies that the data transmission service belongs to an emergency service or a user indication identifies that the data transmission service belongs to the emergency service, wherein the service type of the data transmission service is identified according to a name of the data transmission service or according to a filename or extension name of a file transmitted by the data transmission service, and wherein the emergency service comprises an upgrade package transmission service, a preset configuration file transmission service of an application, or a data transmission service with a data file size greater than a first threshold;

provide, in response to determining the data sending mode for running the data transmission service, a vendor-specific debug command instructing a controller to enter the determined data sending mode; and run the data transmission service in the determined data sending mode using an interface implementing the low energy short range wireless communication protocol.

* * * * *